(12) United States Patent
Sakaguchi

(10) Patent No.: US 7,380,816 B2
(45) Date of Patent: Jun. 3, 2008

(54) DEVICE FOR ACTUATING THE HORN ON STEERING WHEELS

(75) Inventor: Takashi Sakaguchi, Mömbris (DE)

(73) Assignee: Takata-Petri AG (DE)

( * ) Notice: Subject to any disclaimer, the term of this patent is extended or adjusted under 35 U.S.C. 154(b) by 0 days.

(21) Appl. No.: 11/139,105

(22) Filed: May 27, 2005

(65) Prior Publication Data

US 2005/0269193 A1 Dec. 8, 2005

Related U.S. Application Data

(63) Continuation of application No. PCT/DE2003/003864, filed on Nov. 19, 2003.

(30) Foreign Application Priority Data

Nov. 27, 2002 (DE) .......................... 202 18 554 U (51) Int. Cl.
*B60R 21/16* (2006.01)

(52) U.S. Cl. ................ 280/731; 200/61.54; 200/61.55; 200/61.56

(58) Field of Classification Search ............ 200/61.54, 200/61.55, 61.56, 61.57; 280/731
See application file for complete search history.

(56) References Cited

U.S. PATENT DOCUMENTS

| | | | |
|---|---|---|---|
| 4,872,364 A * | 10/1989 | Kaga et al. ............... | 74/484 H |
| 4,939,951 A * | 7/1990 | Kaneko ...................... | 74/552 |
| 5,193,412 A * | 3/1993 | Hashiba ...................... | 74/552 |
| 5,410,114 A | 4/1995 | Furuie et al. | |
| 6,073,514 A * | 6/2000 | Isomura ...................... | 74/552 |
| 6,164,687 A | 12/2000 | Yamamoto et al. | |
| 6,402,193 B1 | 6/2002 | Fleckenstein | |
| 6,422,594 B2 * | 7/2002 | Hasebe ...................... | 280/731 |
| 6,455,792 B1 | 9/2002 | Sakaguchi | |
| 6,572,138 B1 * | 6/2003 | Bohn et al. ................. | 280/731 |
| 6,846,995 B2 * | 1/2005 | Bonn ...................... | 200/61.54 |
| 6,942,247 B2 * | 9/2005 | Simpson ................... | 280/731 |
| 7,052,035 B2 * | 5/2006 | Kreuzer .................... | 280/728.2 |
| 7,053,322 B2 * | 5/2006 | Helmstetter et al. ...... | 200/61.54 |
| 2002/0153714 A1 | 10/2002 | Kreuzer | |

FOREIGN PATENT DOCUMENTS

DE 77 25 910 U1 1/1978
DE 27 40 986 B2 12/1980

(Continued)

OTHER PUBLICATIONS

PCT International Preliminary Examination Report dated Mar. 8, 2005 for International Application No. PCT/DE2003/003864 (4 pages).

*Primary Examiner*—Toan To
(74) *Attorney, Agent, or Firm*—Fitch, Even, Tabin & Flannery (57) ABSTRACT

The invention relates to a device for actuating the horn on steering wheels, comprising a steering wheel frame and at least one fixed horn contact provided thereon, and comprising a moving paddling support i.e. generator support and at least one horn contact, which is provided thereon and to which the fixed horn contact is assigned. The invention provides that the padding support i.e. the generator support is mounted on the steering wheel frame in a manner that enables it to pivot at a position.

20 Claims, 11 Drawing Sheets

FOREIGN PATENT DOCUMENTS

| | | |
|---|---|---|
| DE | 43 44 615 C2 | 7/1995 |
| DE | 297 19 275 U1 | 2/1998 |
| DE | 197 03 470 A1 | 4/1998 |
| DE | 298 19 044 U1 | 2/1999 |
| DE | 299 06 374 U1 | 8/1999 |
| DE | 100 52 386 A1 | 5/2001 |
| DE | 201 06 694 U1 | 6/2001 |
| EP | 0 798 171 A2 | 10/1997 |
| EP | 1 251 043 A1 | 10/2002 |
| GB | 2 002 963 A | 2/1979 |
| JP | 2001-199300 A | 7/2001 |
| WO | WO 98/42544 A1 | 10/1998 |

* cited by examiner

DEVICE FOR ACTUATING THE HORN ON STEERING WHEELS

RELATED APPLICATIONS

This is a continuation of International Application No. PCT/DE2003/003864, filed Nov. 19, 2003, which claims priority from German application No. DE20218554.0, filed Nov. 27, 2002, which are hereby incorporated herein by reference in their entirety.

FIELD OF THE INVENTION

The invention relates to arrangements for actuating the horn on steering wheels.

BACKGROUND OF THE INVENTION

In addition to steering wheels having axially moveable contact links on which at least one contact is provided which is assigned a fixed mating contact on the steering wheel frame, WO 98/42544 discloses a steering wheel, in which the moveable contact is provided on the generator support. Said contact is fastened to at least one section of the steering wheel that is elastically deformable in the direction of the associated mating contact. Compared to the previously mentioned arrangement, in this steering wheel the contact link is omitted, thus reducing the manufacturing costs. The drawback is that this arrangement is suitable only for module-integrated steering wheels, i.e. for steering wheels in which the airbag covering situated over the airbag unit is part of the steering wheel rim. Furthermore, in this arrangement a considerable effort has to be expended to actuate the horn, since the elastic section of the steering wheel is not able to be designed to be as soft as desired because of the fastening function for the generator support.

SUMMARY OF THE INVENTION

The invention is based on the object of providing an easily actuable arrangement for actuating the horn without a contact link.

According to the invention, this is achieved according to the features described hereinafter.

In the case of an arrangement for actuating the horn on steering wheels, having a steering wheel frame and at least one fixed horn contact provided thereon and also having a moveable padded support or generator support and at least one horn contact which is arranged thereon and is assigned to the fixed horn contact, according to the invention the padded support or the generator support is mounted on the steering wheel frame in a manner such that it can be pivoted at one location. As a result of a pivotable mounting at just one location, there is the advantage of it being possible for the padded support or generator support to be designed in a simple manner such that it can be pivoted on all sides. Furthermore, the one bearing means that manufacturing costs are reduced.

The steering wheel frame preferably has a curved bearing surface which is assigned at least one bearing element on the padded support or on the generator support. This type of bearing is simple and therefore also particularly cost-effective.

The same advantages arise if the padded support or the generator support has a curved bearing surface which is assigned at least one bearing element on the steering wheel frame.

It is particularly advantageous if the bearing surface is designed in such a manner that it can be engaged around by the bearing element, since then at the bearing additional securing means can be omitted. The bearing surface is preferably designed as a spherical segment. In one preferred embodiment, there are a plurality of elastically deformable bearing segments, for example three bearing segments.

In order to facilitate the placing of the bearing segments, which engage around the bearing surface, onto the bearing surface, the bearing segments have placing-on slopes at the ends of their bearing surface.

The bearing elements which engage around the bearing surface are mounted on the bearing surface in a manner such that they can be snapped into place, i.e. they rest entirely on the bearing surface. In order to enable removal, it is expedient for the bearing elements also to be mounted on the bearing surface in a manner such that they can be disengaged.

At least one hook engaging in an opening of the steering wheel frame is provided for the resilient fastening of the padded support or generator support and furthermore at least one spring is provided between the steering wheel frame and padded support or generator support.

It is expedient to provide a compression spring as the spring.

In one embodiment, at least one of the openings for receiving hooks has a wide section for the introduction of the hook and a narrow section for the working position of the hook, it being possible for the bearing element to be placed onto the bearing surface in this position. During installation, the hooks are first of all introduced into the wide section of the openings and are then pushed into the narrow section. Since the bearing element is situated above the bearing surface in this position, the bearing element can be pressed onto the bearing surface.

In a further embodiment, provision is made for at least one of the openings for receiving hooks to have at least one wedge-shaped limiter for preventing the hook from sliding back after being introduced into the opening.

Preferably, three hooks are provided which are arranged in such a manner that they are situated in the corners of an imaginary triangle.

The bearings may be arranged at different locations. Thus, in one embodiment, a bearing is provided which is arranged in the center between two openings for the hooks at least approximately on the connecting line between the two openings. In another embodiment, a bearing is provided which, in the case of the arrangement of three hooks, is arranged close to the opening for one hook.

The padded support or generator support including the bearing element or the bearing surface expediently consists of plastic. The padded support or generator support preferably consists of 2-component plastic, the first component having a glass fiber reinforcement while the second component is designed without a glass fiber reinforcement.

In one embodiment, the spring element together with the second component of the padded support or generator support is of single-part design.

The steering wheel frame at least partially consists of light metal die casting or plastic.

BRIEF DESCRIPTION OF THE DRAWINGS

The invention will be explained in exemplary embodiments with reference to drawings, in which.

DETAILED DESCRIPTION OF THE PREFERRED EMBODIMENTS

Figure 1:
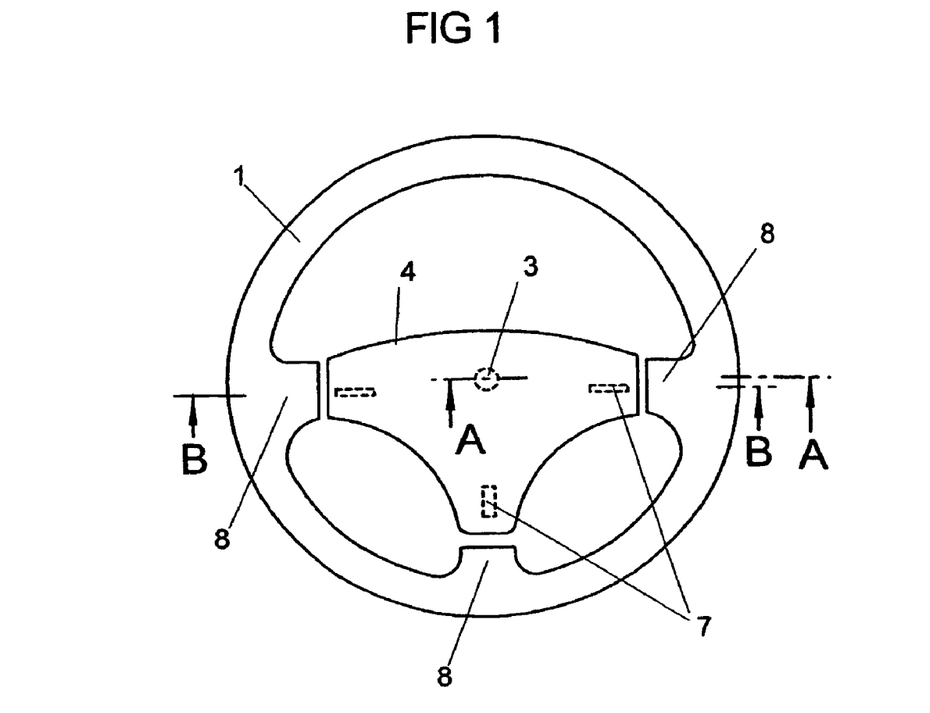
FIG. 1 shows a steering wheel with a pivotable padded support or generator support in plan view.
Figure 2:
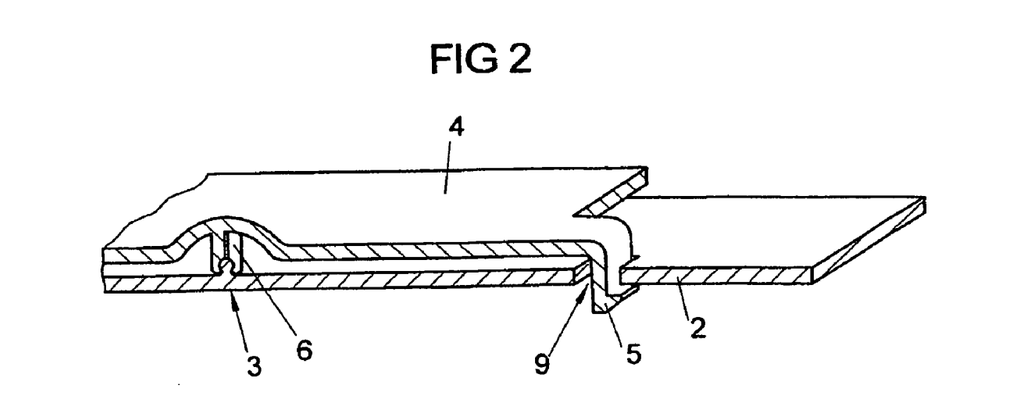
FIG. 2 shows the section A-A according to FIG. 1.
Figure 7:
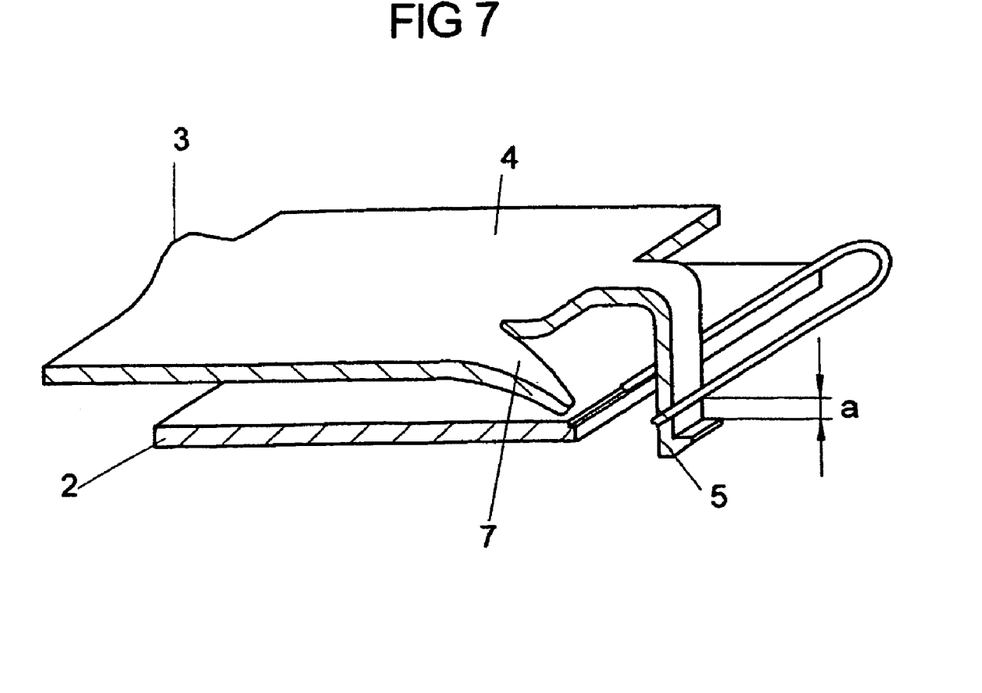
FIG. 7 shows the right section of the section B-B according to FIG. 1 with a first embodiment of a compression spring according to FIG. 3

FIG. 1 illustrates, in plan view, a steering wheel 1 which has a steering wheel frame 2 with a pivot bearing 3 for the mounting of a padded support or generator support 4 (FIG. 2). To simplify the description only the generator support will be mentioned below, with the details referring in an identical manner to the padded support. The generator support 4 has hooks 5 which reach through openings 9 and 10 (FIG. 9) in the steering wheel frame 2. In order to return the generator support 4 into the starting position after a horn-sounding operation, compression springs 7 are arranged between the steering wheel frame 2 and the generator support 4 (FIG. 7). The generator support 4 extends above the spokes 8 of the steering wheel.

Figure 3:
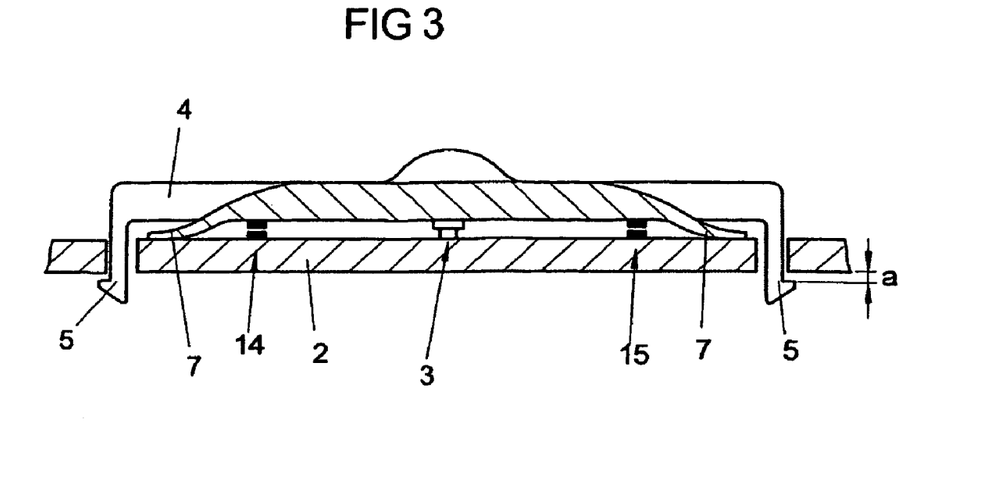
FIG. 3 shows the section B-B according to FIG. 1 with the arrangement for actuating the horn in the neutral position.
Figure 4:
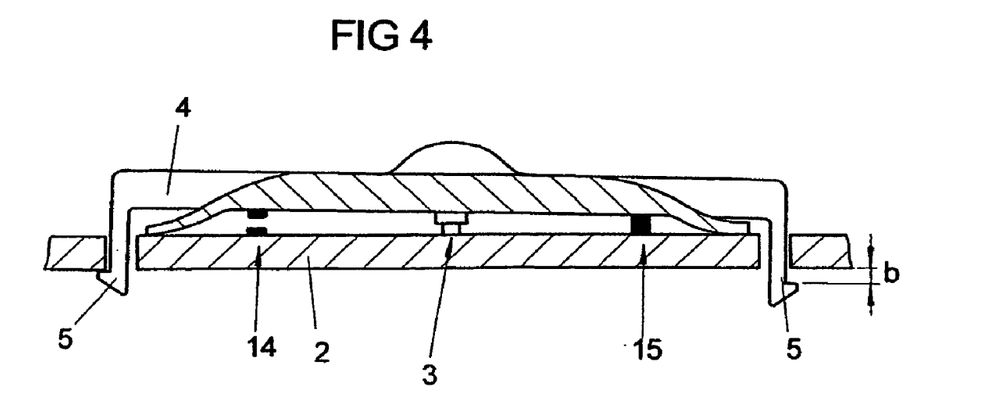
FIG. 4 shows the section B-B according to FIG. 1 with the arrangement for actuating the horn in the pivoting position.

In the section illustrated in FIG. 3, the horn arrangement is illustrated in a neutral position, in which the hooks 5 of the generator support 4, which hooks reach through the openings of the steering wheel frame 2, are at an identical spacing a from the steering wheel frame. Furthermore, horn contacts 14, 15 are situated opposite each other at the same spacing. When the horn is actuated, pivoting of the generator support 4 causes the hook 5 which is situated on the left in the figure to rest on the steering wheel frame 2 while the spacing of the hook 5 situated on the right increases to the size b (FIG. 4). The horn contacts 15 then rest in a close-fitting manner on each other while the horn contacts 14 are situated opposite each other at a greater spacing.

Figure 5:
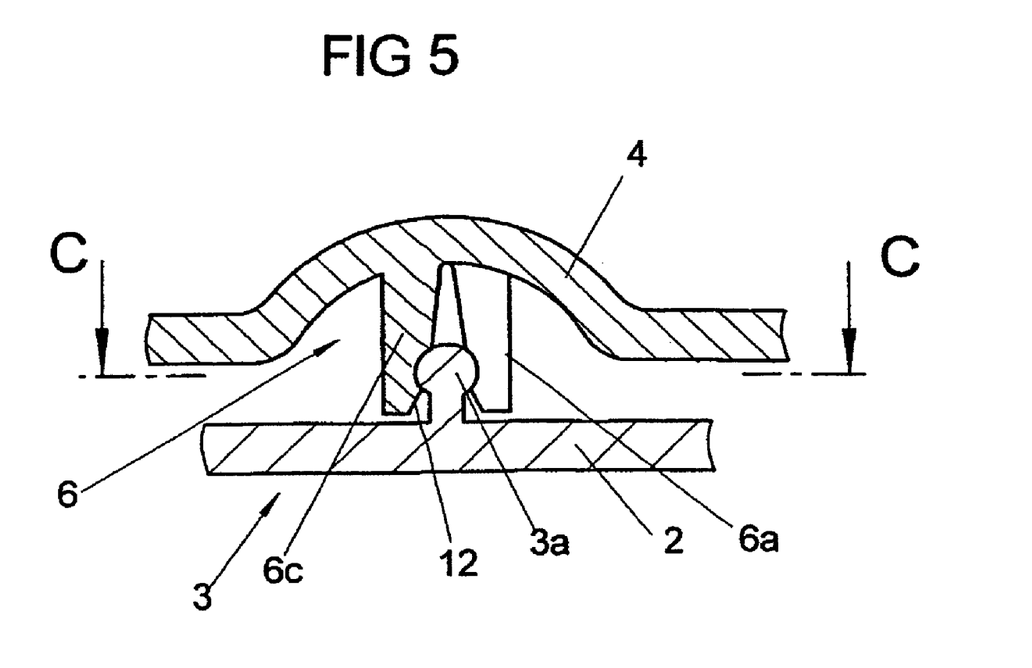
FIG. 5 shows the pivotable mounting as a detail.
Figure 6:
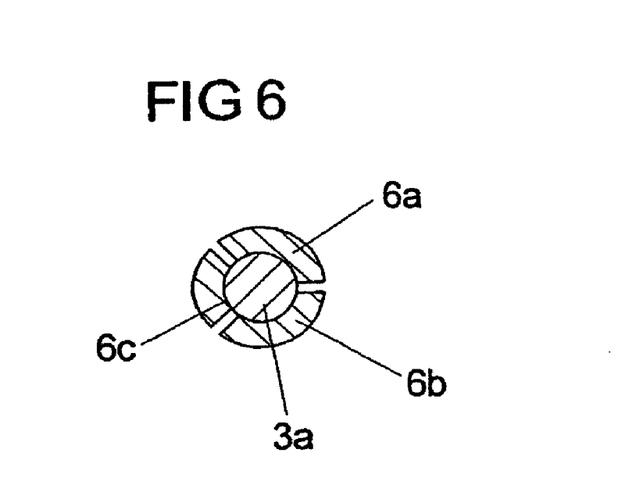
FIG. 6 shows the section C-C according to FIG. 5.

FIGS. 5 and 6 illustrate the pivot bearing 3 in the form of a detail. The steering wheel frame 2 has a bearing surface 3a which is in the form of a spherical segment. This bearing surface is assigned the bearing element 6 on the generator support 4, which bearing element has three elastically deformable bearing segments 6a, b, c which engage around the bearing surface 3a. For easier installation of the bearing element 6, the bearing segments 6a, b, c have, at their ends, placing-on slopes 12 and bearing sections which are matched to the spherical shape of the bearing surface 3a. During installation, the bearing segments are pressed onto the bearing surface until they engage around the latter and rest with their bearing sections on the bearing surface 3a and are therefore snapped into place. Removal is possible in this arrangement by the bearing segments being pulled off the bearing surface.

The section illustrated in FIG. 7 illustrates an embodiment of the compression spring. The compression spring 7 here is an integral part of the generator support 4 which consists of elastically deformable plastic. The compression spring is designed as a narrow tongue of the generator support 4, which tongue is bent away obliquely downward. The generator support 4 is illustrated here in the neutral position, in which there is the clearance a between the steering wheel frame 2 and the hook 5. In this neutral position, the tongue rests on the steering wheel frame under prestress. When depressed, the tongue is elastically deformed while the opposite tongue, as is apparent from FIG. 3, relaxes but still rests on the steering wheel frame 2.

Figure 8:
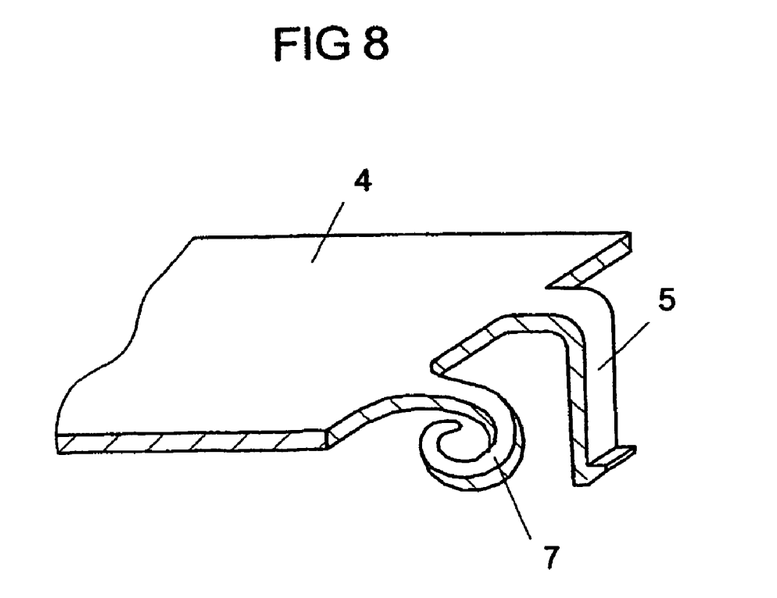
FIG. 8 shows the right section of the section B-B according to FIG. 1 with a second embodiment of a compression spring.

FIG. 8 illustrates a further form of the compression spring 7. In this embodiment too, the compression spring is an integral part of the generator support 4. In this embodiment, the compression spring is of spiral-shaped design, is likewise bent away obliquely downward and likewise rests under prestress on the steering wheel frame 2, which is not illustrated in this figure.

Figure 9:
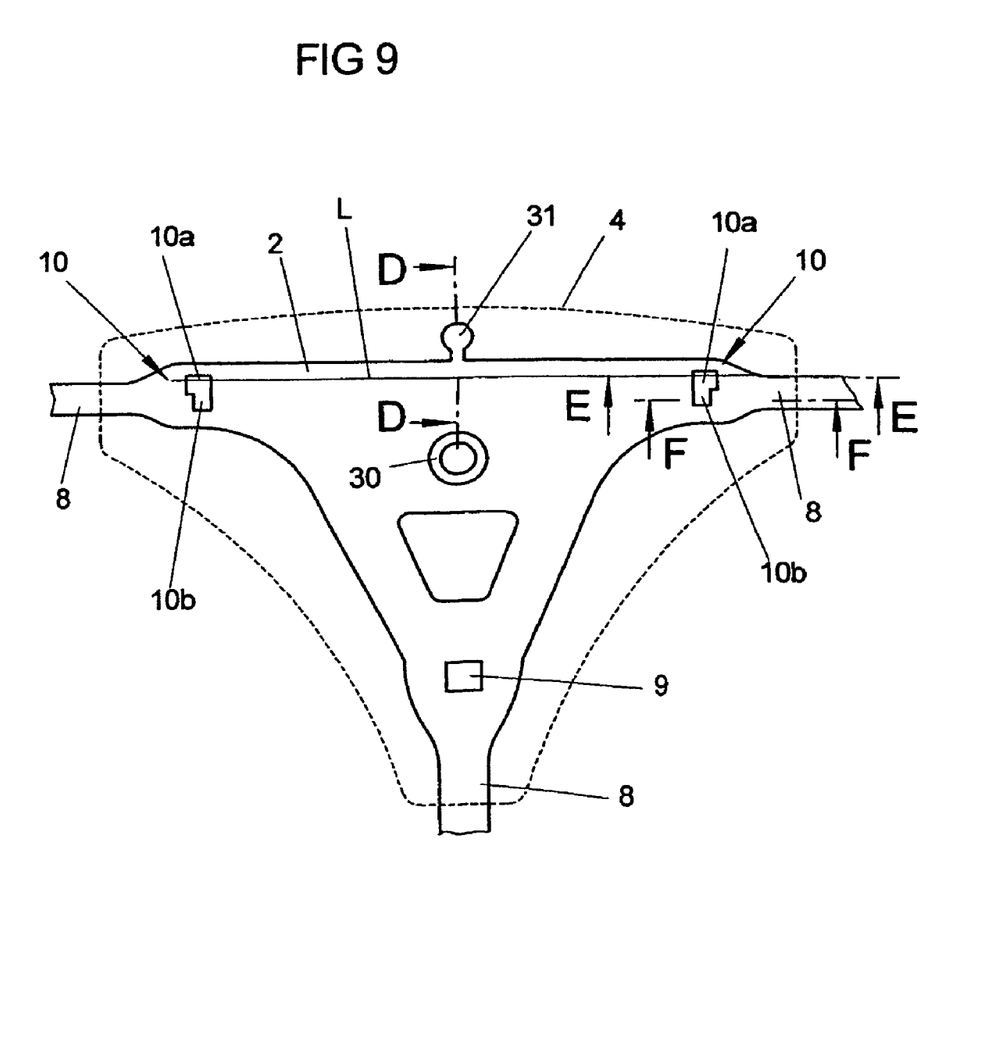
FIG. 9 shows a plan view of a steering wheel frame.

In the case of the steering wheel frame 2 illustrated in plan view in FIG. 9, the pivot bearing 31 is arranged in the center between the two openings 10 for two hooks 5 and approximately on the connecting line L between these two openings. The opening 9 for a further hook 5 is likewise arranged in the center between the openings 10, but offset in such a manner that the openings, and therefore also the hooks which engage in them, are situated in the corners of an imaginary triangle. Each opening 10 has a wide section 10a for the introduction of the hooks 5 and a narrow section 10b for the final position of the hooks 5. The steering wheel frame 2 furthermore has a bushing 30 for receiving the steering column (not illustrated).

Figure 10:
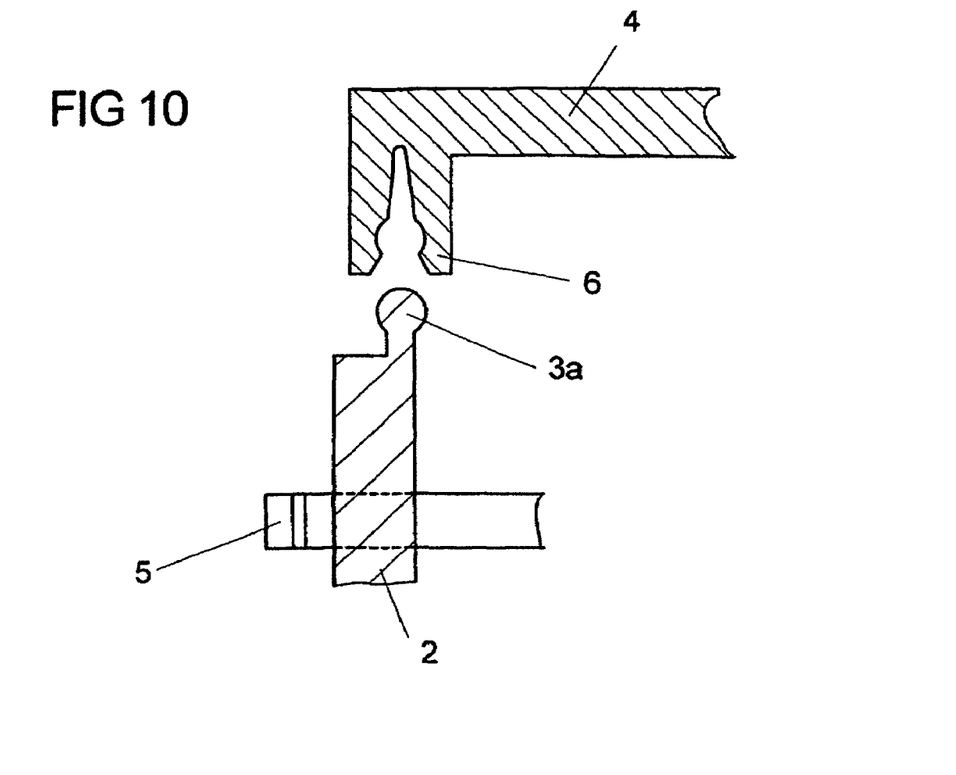
FIG. 10 shows the section D-D of FIG. 9 with the bearing before the bearing elements snap into place.
Figure 11:
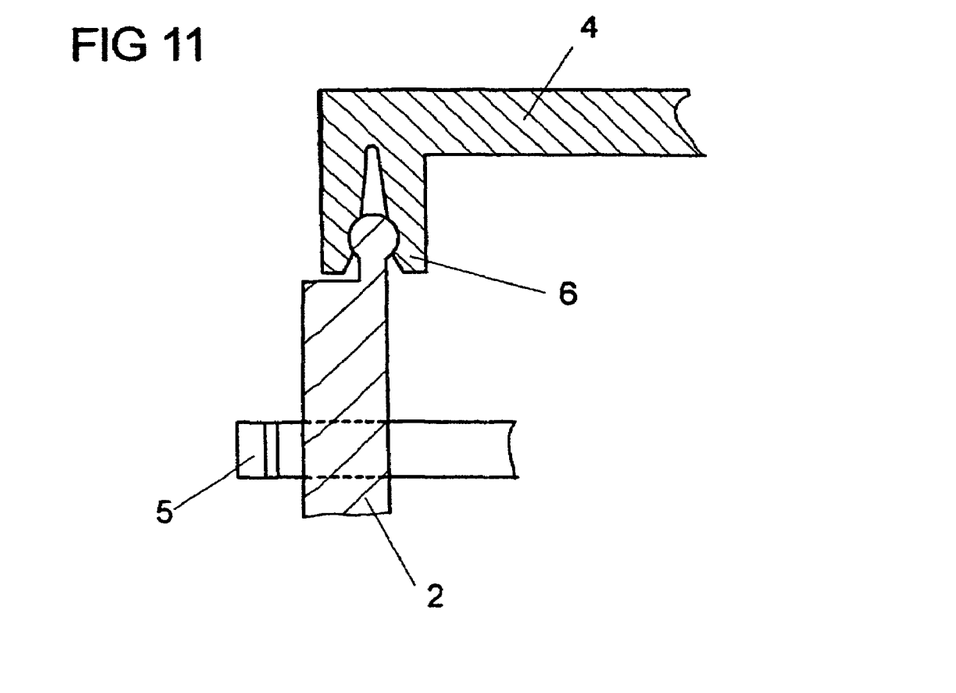
FIG. 11 shows the section D-D of FIG. 9 with the bearing after the bearing elements have snapped into place.
Figure 12:
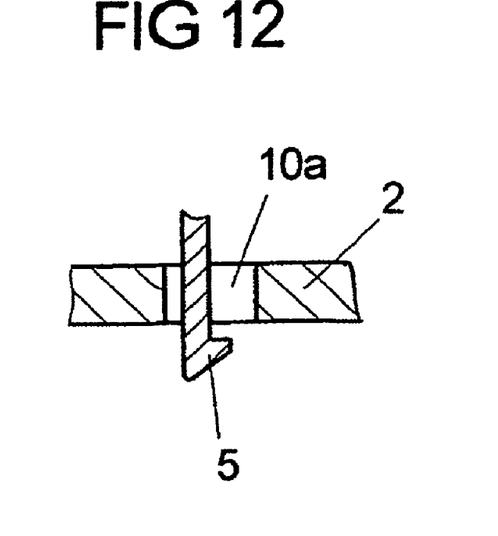
FIG. 12 shows the section E-E of FIG. 9 with a hook position before the bearing elements snap into place.
Figure 13:
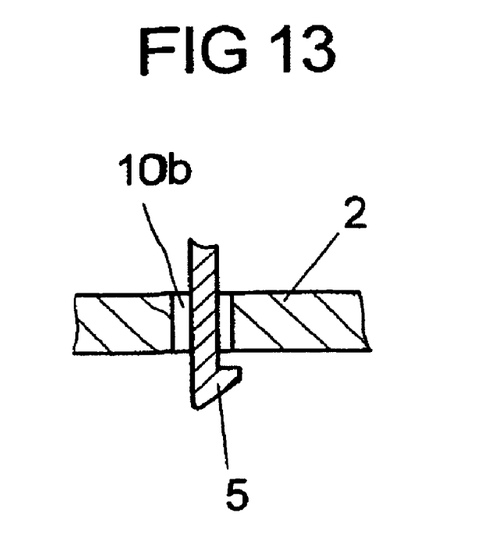
FIG. 13 shows the section F-F of FIG. 9 with a hook position after the bearing elements snap into place.

During installation, first of all the hooks 5 are introduced into the sections 10a of the openings 10, as is illustrated in FIG. 12, and into the opening 9. The generator support 4 is then displaced in the direction of the narrow sections 10b. The hooks have therefore been brought into their final position, as is illustrated in FIG. 13, and at the same time the bearing element 6 is situated above the bearing surface 3a in this position (FIG. 10). The bearing element 6 is subsequently pressed onto the bearing surface 3a until the final position illustrated in FIG. 11 is reached.

Figure 14:
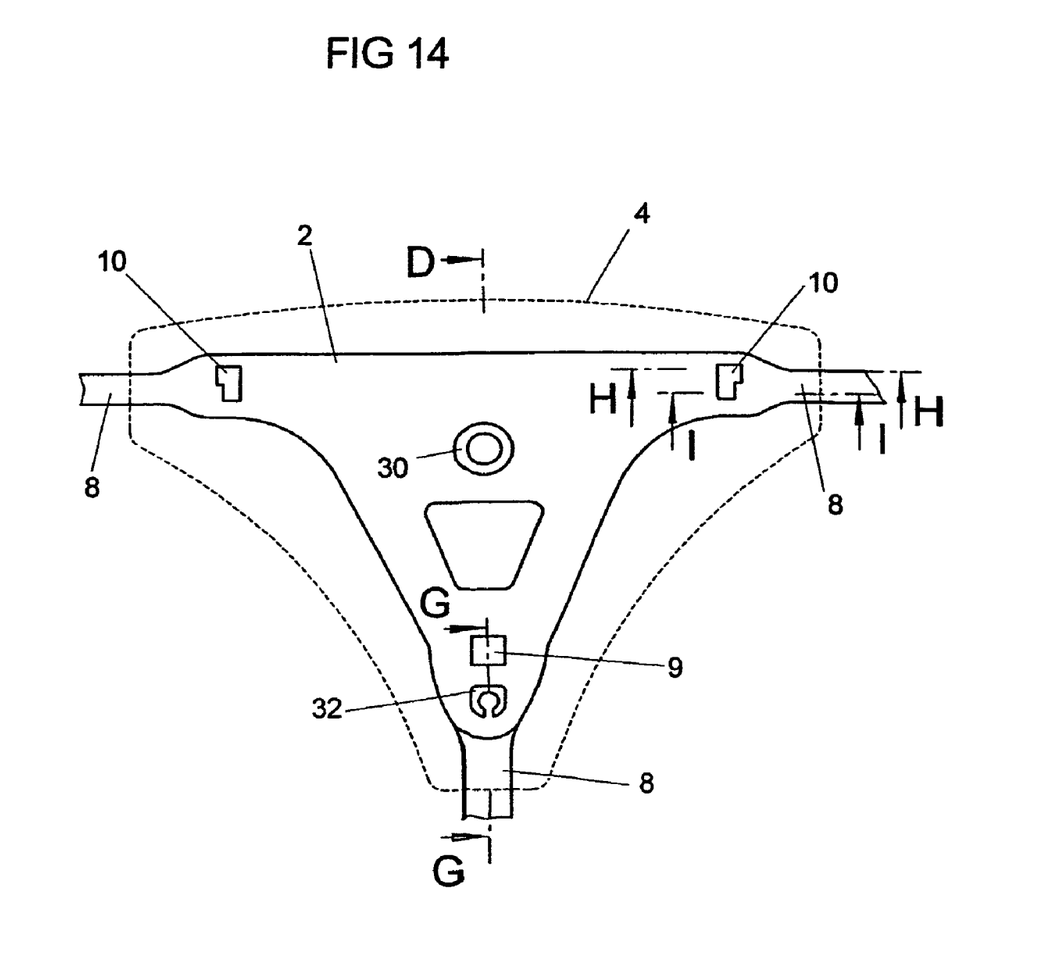
FIG. 14 shows a plan view of a steering wheel frame with a further embodiment of the position of the pivot bearing.
Figure 15:
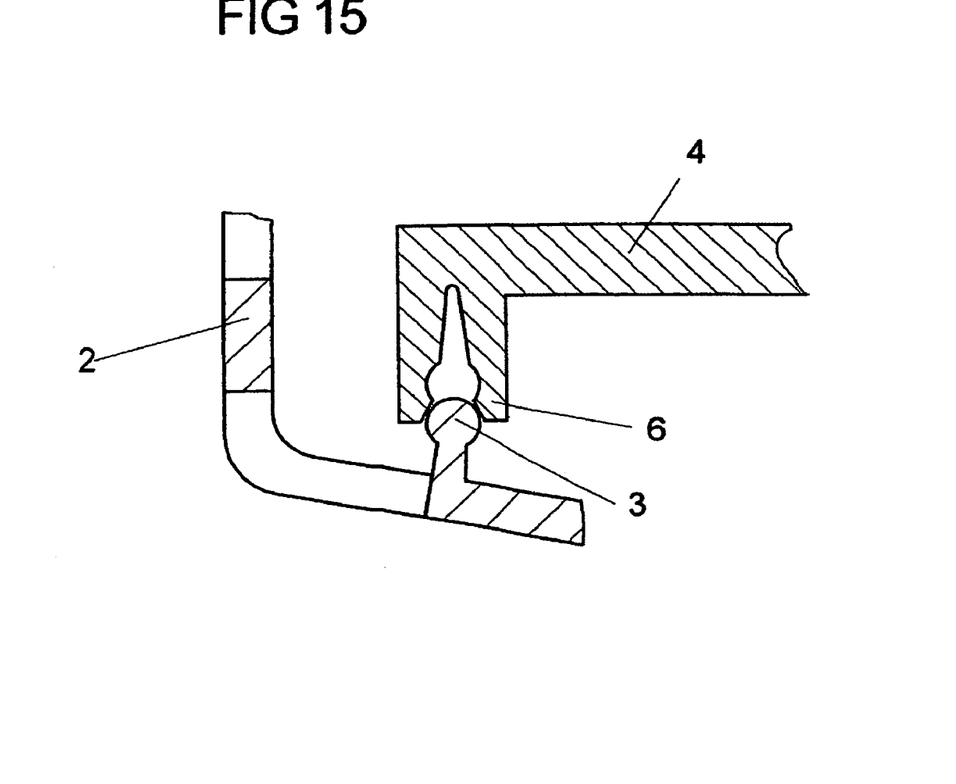
FIG. 15 shows the section G-G of FIG. 14 with the bearing before the bearing elements snap into place.
Figure 16:
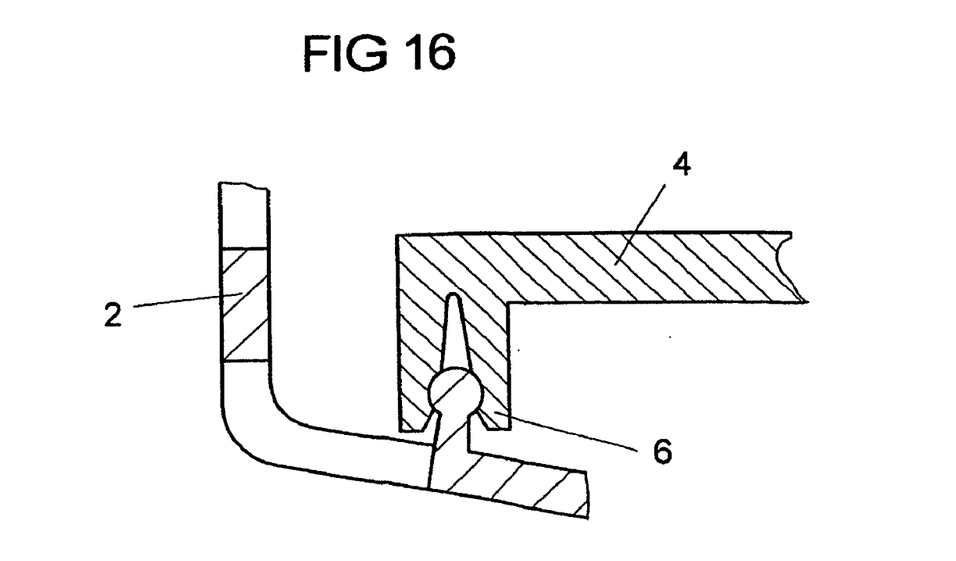
FIG. 16 shows the section G-G of FIG. 14 with the bearing after the bearing elements snap into place.
Figure 17:
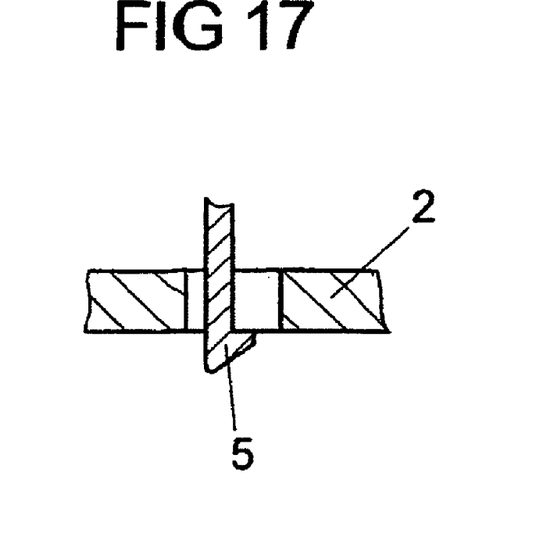
FIG. 17 shows the section H-H of FIG. 14 with a hook position before the bearing elements snap into place.
Figure 18:
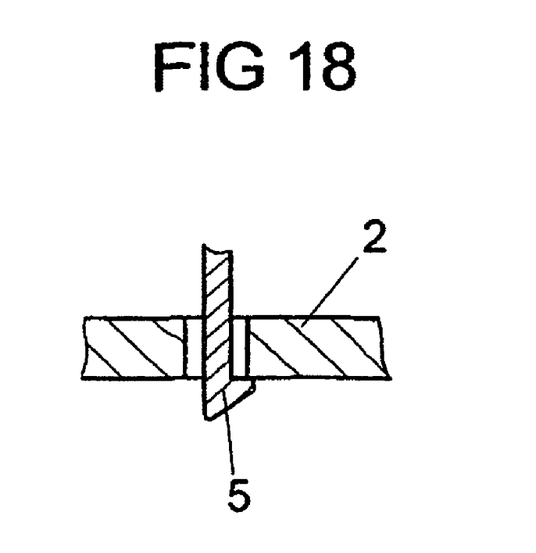
FIG. 18 shows the section I-I of FIG. 14 with a hook position after the bearing elements have snapped into place.

In the case of the exemplary embodiment of FIG. 14, a pivot bearing 32 is likewise arranged in the center between the two openings 10. However, in contrast to the exemplary embodiment of FIG. 9, it is arranged close to the opening 9. The installation takes place in the same manner as in the case of the exemplary embodiment of FIG. 9, and the individual phases of FIGS. 15 to 18 correspond to those of FIGS. 10 to 13.

Figure 19:
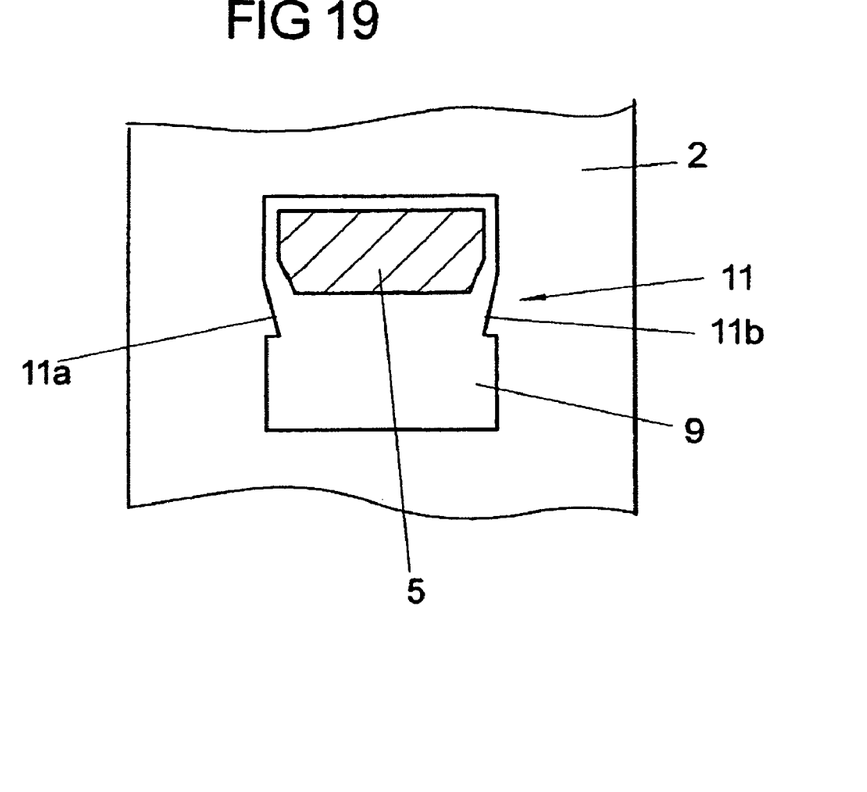
FIG. 19 shows a detail of the steering wheel frame in plan view with a hook opening together with limiter in the introduction phase of the hook.
Figure 20:
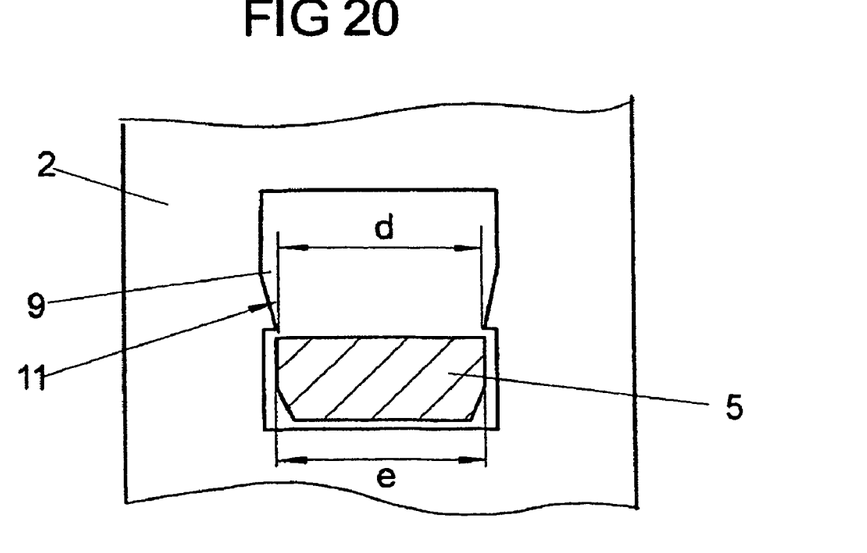
FIG. 20 shows the detail according to FIG. 19 with the hook in the final position.

While the openings 10 have sections 10a and 10b for the introduction and for the final position of the hooks 5, a limiter 11 which prevents the hook 5 from sliding back out of the final position is provided in the opening 9. The limiter 11 has two opposite limiter sections 11a, 11b which protrude in a wedge-shaped manner into the opening 9. In this case, the spacing d between the limiter sections 11a, 11b is smaller than the width e of the hook 5 (FIG. 20). FIG. 19 illustrates the introductory phase of the hook, in which the hooks 5 assigned to the openings 10 are situated in the sections 10a (FIG. 12). By displacement of the generator support 4, the hook 5, which is assigned to the opening 9, is pushed over the elastically deformable limiter sections 11a, 11b until it has reached the final position illustrated in FIG. 20. In this position, the hooks 5 assigned to the openings 10 are likewise situated in the final position (FIG. 13).

What is claimed is:

1. An arrangement for actuating a horn on a steering wheel, having a steering wheel frame and at least one fixed horn contact provided on the frame and also having a moveable padded support or generator support and at least one horn contact which is arranged on the support and cooperates with the fixed horn contact for actuating the horn, characterized in that the padded support or the generator support is mounted on the steering wheel frame in a manner such that it is pivoted at one location, and the steering wheel frame has a curved bearing surface which cooperates with at least one bearing element on the padded support or on the generator support for pivoting the padded support or the generator support at the one location.

2. The arrangement as claimed in claim 1, characterized in that the bearing surface is designed in such a manner that it can be engaged around by the bearing element.

3. The arrangement as claimed in claim 1, characterized in that the bearing surface is designed as a spherical segment.

4. The arrangement as claimed in claim 1, characterized in that the bearing element comprises a plurality of elastically deformable bearing segments.

5. The arrangement as claimed in claim 4, characterized in that there are three bearing segments.

6. The arrangement as claimed in claim 4, characterized in that the bearing segments have placing-on slopes at the ends of their bearing surface.

7. The arrangement as claimed in claim 1, characterized in that the bearing elements are mounted on the bearing surface in a manner such that they can be snapped into place.

8. The arrangement as claimed in claim 1, characterized in that the bearing elements are mounted on the bearing surface in a manner such that they can be disengaged.

9. The arrangement as claimed in claim 1, characterized in that the padded support or generator support including the bearing element or the bearing surface consists of plastic.

10. The arrangement as claimed in claim 9, characterized in that the padded support or generator support consists of 2-component plastic, the first component having a glass fiber reinforcement while the second component is designed without a glass fiber reinforcement.

11. An arrangement for actuating a horn on a steering wheel, having a steering wheel frame and at least one fixed horn contact provided on the frame and also having a moveable padded support or generator support and at least one horn contact which is arranged on the support and cooperates with the fixed horn contact for actuating the horn, characterized in that the padded support or the generator support is mounted on the steering wheel frame in a manner such that it is pivoted at one location, at least one hook engaging in an opening of the steering wheel frame is provided for the resilient fastening of the padded support or generator support, and at least one spring is provided between the steering wheel frame and padded support or generator support.

12. The arrangement as claimed in claim 11, characterized in that a compression spring is provided as the spring.

13. The arrangement as claimed in claim 11, characterized in that at least one of the openings for receiving hooks has a wide section for inserting the hook therethrough and a narrow section for a final position of the hook in the one opening, to allow the bearing element to be placed onto the bearing surface with the hook in the final position thereof.

14. The arrangement as claimed in claim 11, characterized in that at least one opening for receiving a hook has at least one wedge-shaped limiter for preventing the hook from sliding back after being introduced into the opening.

15. The arrangement as claimed in at least one of claims 11, characterized in that three hooks are provided which are arranged in such a manner that they are situated in the corners of an imaginary triangle.

16. The arrangement as claimed in claim 11, characterized in that a bearing is provided which is arranged in the center between two openings for the hooks at least approximately on the connecting line between the two openings.

17. The arrangement as claimed in claim 11, characterized in that a bearing is provided which, in the case of the arrangement of three hooks, is arranged close to the opening for one hook.

18. The arrangement as claimed in claim 11, characterized in that the spring element together with the second component of the padded support or generator support is of single-part design.

19. The arrangement as claimed in claim 11, characterized in that the steering wheel frame at least partially consists of light metal die casting.

20. An arrangement for actuating a horn on a steering wheel, having a steering wheel frame and at least one fixed horn contact provided on the frame and also having a moveable padded support or generator support and at least one horn contact which is arranged on the support and cooperates with the fixed horn contact for actuating the horn, characterized in that the padded support or the generator support is mounted on the steering wheel frame in a manner such that it is pivoted at one location, and the padded support or the generator support has a curved bearing surface which cooperates with at least one bearing element on the steering wheel frame for pivoting the padded support or the generator support at the one location.

* * * * *